US012695513B2

(12) United States Patent　　　　　(10) Patent No.:　US 12,695,513 B2
Koma et al.　　　　　　　　　　　　　(45) Date of Patent:　　　Jul. 28, 2026

(54) OPTICAL TRANSMITTING APPARATUS, OPTICAL TRANSMISSION SYSTEM AND OPTICAL TRANSMISSION METHOD

(71) Applicant: NTT, Inc., Tokyo (JP)

(72) Inventors: Ryo Koma, Musashino (JP); Junichi Kani, Musashino (JP); Kazutaka Hara, Musashino (JP); Takuya Kanai, Musashino (JP)

(73) Assignee: NTT, Inc., Tokyo (JP)

( * ) Notice: Subject to any disclaimer, the term of this patent is extended or adjusted under 35 U.S.C. 154(b) by 245 days.

(21) Appl. No.: 18/294,288

(22) PCT Filed: Aug. 3, 2021

(86) PCT No.: PCT/JP2021/028779
§ 371 (c)(1),
(2) Date: Feb. 1, 2024

(87) PCT Pub. No.: WO2023/012897
PCT Pub. Date: Feb. 9, 2023

(65) Prior Publication Data
US 2025/0096902 A1　　Mar. 20, 2025

(51) Int. Cl.
H04B 10/516　　(2013.01)
H04B 10/27　　(2013.01)
(52) U.S. Cl.
CPC ......... H04B 10/5161 (2013.01); H04B 10/27 (2013.01)
(58) Field of Classification Search
None
See application file for complete search history.

(56) References Cited

U.S. PATENT DOCUMENTS 4,561,119 A　　12/1985　Epworth
2008/0239448 A1 *　10/2008　Tanaka ................. G02F 1/2255
　　　　　　　　　　　　　　　　359/245
(Continued)

FOREIGN PATENT DOCUMENTS

EP　　　　1220480 A1　　7/2002
JP　　　　S5875340 A　　5/1983
(Continued)

OTHER PUBLICATIONS

Noriaki Kaneda, "DSP for 50G/100G Hybrid Modulated TDM-PON", 2020 European Conference on Optical Communications (ECOC).
(Continued)

*Primary Examiner* — David W Lambert
(74) *Attorney, Agent, or Firm* — Harness, Dickey & Pierce, 1PLC

(57)　　　　　　ABSTRACT

An aspect of the present invention is an optical transmitter including: a first modulation unit configured to generate an optical modulated signal through intensity modulation of an optical signal; a second modulation unit configured to generate an optical modulated signal through phase/frequency modulation of the optical signal; and a modulation scheme switching unit configured to switch a modulator of the optical signal to one of the first and second modulation units. The modulation scheme switching unit switches the modulator to a modulation unit corresponding to a device of a connection destination between the first and second modulation units.

6 Claims, 15 Drawing Sheets

(56) References Cited

U.S. PATENT DOCUMENTS

| | | |
|---|---|---|
| 2013/0209093 A1 | 8/2013 | Tanimura et al. |
| 2016/0036530 A1 | 2/2016 | Yamamoto |
| 2018/0034552 A1* | 2/2018 | Oyama ................ G03H 1/0005 |
| 2019/0288777 A1 | 9/2019 | Ishimura et al. |

FOREIGN PATENT DOCUMENTS

| | | |
|---|---|---|
| JP | H04502217 A | 4/1992 |
| JP | 2001-086104 A | 3/2001 |
| JP | 2008-249848 A | 10/2008 |
| JP | 2013-165407 A | 8/2013 |
| JP | 2018-019245 A | 2/2018 |
| JP | 2018-113555 A | 7/2018 |
| JP | 2018-201118 A | 12/2018 |
| WO | WO-90/07141 A1 | 6/1990 |
| WO | WO-2014/141685 A1 | 9/2014 |

OTHER PUBLICATIONS

Yasuhiko Aoki et al., "Next-Generation Photonics Transport Network Using Digital Signal Processing", Fujitsu. 62, 5 (Sep. 2011).

* cited by examiner

OPTICAL TRANSMITTING APPARATUS, OPTICAL TRANSMISSION SYSTEM AND OPTICAL TRANSMISSION METHOD

CROSS-REFERENCE TO RELATED APPLICATIONS

This application is a 371 U.S. National Phase of International Application No. PCT/JP2021/028779, filed on Aug. 3, 2021. The entire disclosure of the above application is incorporated herein by reference.

TECHNICAL FIELD

The present invention relates to technologies of an optical transmitter (an optical transmitting apparatus), an optical transmission system (an optical transmission system), and an optical transmission method (an optical transmission method).

BACKGROUND ART

In the related art, in order to realize a large capacity of optical communication, research and development of an optimum modulation technology to which an optimum modulation scheme and a signal processing algorithm are applied in accordance with a transmission distance between transmission and reception nodes and a required signal speed has progressed. For example, FIG. 14 illustrates a configuration example of communication in an all photonics network (APN) of an innovative optical and wireless network (IOWN). FIG. 14(A) illustrates a configuration example (short distance communication) in which an optical gateway device performs return communication between the user devices connected to the same optical gateway device (photonic gateway (Ph-GW)). On the other hand, FIG. 14(B) illustrates a configuration example (long distance communication) in which data is transmitted between user devices connected to different optical gateway devices through pass-through communication. In such an APN of the IOWN, since it is desired to exclude electrical processes such as photoelectric conversion and a routing process of electrical signals as much as possible, it is necessary to adaptively control transmission parameters in accordance with a form of a transmission path.

FIG. 15 is a diagram schematically illustrating a configuration of an optical transmission system according to a conventional technology. FIG. 15(A) illustrates a configuration example of an optical transmission system by an intensity modulation-direct detection scheme, and FIG. 15(B) illustrates a configuration example of an optical transmission system by a phase modulation-digital coherent detection scheme. In the optical transmitter in which adaptive modulation of the related art is used, for example, a scheme of obtaining a gain by changing a redundancy of forward error correction (FEC) by a configuration for changing a multilevel degree of a signal transmitted using a digital signal processing circuit, a Reed-Solomon code, a low density parity check (LDPC) code, or the like is mainstream. For example, as illustrated in FIG. 15(A), in an intensity modulation-direct detection scheme that is often used in an access network or the like, the multilevel degree of amplitude modulation is adaptively changed by switching a modulated signal to a non-return-to-zero (NRZ) signal, a pulse-amplitude modulation (PAM) 4 signal, a PAM 8 signal, a PAM 16 signal, or the like (for example, see Non Patent Literature 1). For example, as illustrated in FIG. 15(B), in the phase modulation-digital coherent reception scheme that is often used in a core network, the multilevel degree of the phase amplitude modulation is adaptively changed by switching a modulated signal to a 4 quadrature amplitude modulation (QAM) signal, a 16 QAM signal, a 64 QAM signal, or the like (for example, see Non Patent Literature 2).

CITATION LIST

Non Patent Literature

Non Patent Literature 1: Noriaki Kaneda, "DSP for 50G/100G Hybrid Modulated TDM-PON", 2020 European Conference on Optical Communications (ECOC)
Non Patent Literature 2: Yasuhiko Aoki, "New-Generation Photonics Transport Network Using Digital Signal Processing", FUJITSU. 62, 5 (09, 2011)

SUMMARY OF INVENTION

Technical Problem

In the related art, however, separate optical transmitters are required for each of the intensity modulation-direct detection scheme and the phase modulation-digital coherent detection scheme, and parameters that can be adaptively changed in each scheme remain parameters of an upper layer that can be changed by a digital signal processing circuit. As described above, in the related art, the optical transmitter capable of applying modulation does not necessarily have a high degree of freedom in scheme change and parameter change.

In view of the foregoing circumstances, an object of the present invention is to provide a technology capable of improving the degree of freedom in changing a transmission scheme or a transmission parameter in adaptive modulation of optical transmission.

Solution to Problem

An aspect of the present invention is an optical transmitter including: a first modulator configured to generate an optical modulated signal through intensity modulation of an optical signal; a second modulator configured to generate an optical modulated signal through phase/frequency modulation of the optical signal; and a modulation scheme switcher configured to switch a modulator of the optical signal to one of the first and second modulators. The modulation scheme switcher switches the modulator to a modulator corresponding to a device of a connection destination between the first and second modulators.

Another aspect of the present invention is an optical transmission system including: one or more user devices including the foregoing optical transmitter and an optical receiver configured to detect an optical signal in conformity with a direct detection scheme or a digital coherent detection scheme; one or more network node devices accommodating the one or more user devices; and a route control device configured to control a communication route formed by the one or more network node devices. The optical transmitter exchanges information related to the negotiation performed with a user device of a communication partner via the route control device.

Still another aspect of the present invention is an optical transmission method including: modulating an optical signal by one of a first modulator that generates an optical modulated signal through intensity modulation of the optical signal and a second modulator that generates an optical modulated signal through phase/frequency modulation of the optical signal; and switching a modulator of the optical signal to either the first or second modulator. In the switching, the modulator is switched to a modulator corresponding to a device of a communication partner between the first and second modulators.

Advantageous Effects of Invention

According to the present invention, it is possible to improve the degree of freedom in changing a transmission scheme or a transmission parameter in adaptive modulation of optical transmission.

DESCRIPTION OF EMBODIMENTS

Embodiments of the present invention are described below in detail, with reference to the drawings.

First Embodiment

Figure 1:
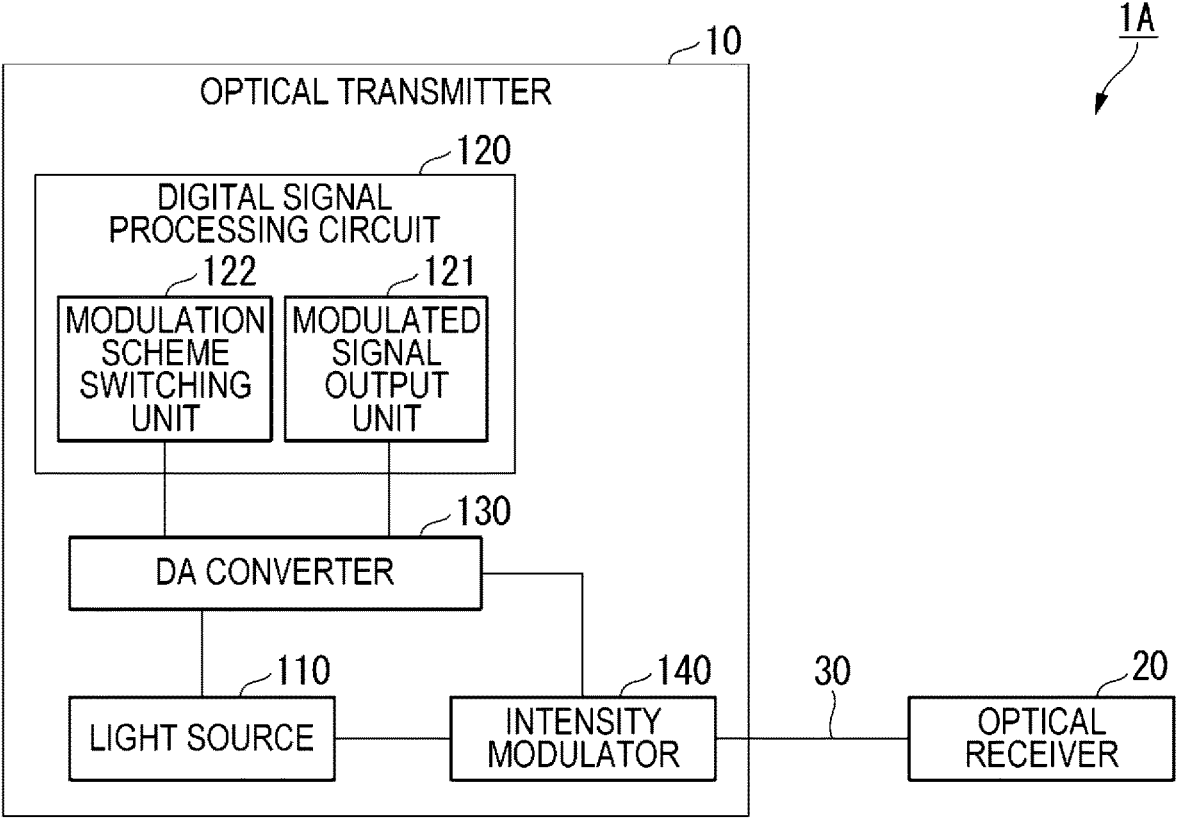
FIG. 1 is a diagram illustrating a configuration example of an optical transmission system according to a first embodiment.

FIG. 1 is a diagram illustrating a configuration example of an optical transmission system 1A according to a first embodiment. The optical transmission system 1A includes an optical transmitter 10, an optical receiver 20, and an optical transmission line 30. The optical transmitter 10 modulates transmission target data (hereinafter referred to as "target data".) into an optical signal and outputs the optical signal to the optical transmission line 30. The optical transmission line 30 includes an optical fiber and connects the optical transmitter 10 to the optical receiver 20. The optical receiver 20 accepts an optical signal from the optical transmission line 30 and demodulates the optical signal to restore target data transmitted from the optical transmitter 10. Hereinafter, configurations of the optical transmitter 10 and the optical receiver 20 will be described in more detail.

The optical transmitter 10 includes, for example, a light source 110, a digital signal processing circuit 120, a DA converter 130, and an intensity modulator 140. The light source 110 transmits continuous light to the DA converter 130 and the intensity modulator 140. The light source 110 outputs, for example, a distributed feedback laser (DFB laser) as continuous light.

The digital signal processing circuit 120 is a circuit that performs digital signal processing related to transmission of target data. Specifically, the digital signal processing circuit 120 includes a modulated signal output unit 121 and a modulation scheme switching unit 122 (modulation scheme switcher). The modulated signal output unit 121 generates a modulated signal for modulating the output light of the light source 110 and outputs the modulated signal to the DA converter 130. For example, the digital signal processing circuit 120 is configured with a processor such as a central processing unit (CPU) and a memory. The digital signal processing circuit 120 functions as the modulated signal output unit 121, the modulation scheme switching unit 122, and a digital signal processing unit for an optical signal by causing the processor to execute a program. Some or all of these functions may be implemented by using hardware such as an application specific integrated circuit (ASIC), a programmable logic device (PLD), or a field programmable gate array (FPGA). The program may be recorded on a computer-readable recording medium. The computer-readable recording medium is, for example, a portable medium such as a flexible disk, a magneto-optical disc, a ROM, a CD-ROM, or a semiconductor storage device (for example, a solid state drive (SSD)), or a storage device such as a hard disk or a semiconductor storage device embedded in a computer system. The program may be transmitted via a telecommunication line.

The DA converter 130 inputs a modulated signal from the digital signal processing circuit 120, converts the input modulated signal into an analog signal, and outputs the analog signal. Hereinafter, the modulated signal converted into the analog signal is referred to as an "analog modulated signal." The analog modulated signal output from the DA converter 130 is input to the light source 110 or the intensity modulator 140 under the control of the modulation scheme switching unit 122 to be described below.

The modulation scheme switching unit 122 has a function of switching a modulation scheme of the light source 110 between intensity modulation and phase/frequency modulation. Specifically, the modulation scheme switching unit 122 switches the modulation scheme of the light source 110 by changing the amplitude and a bias point of the modulated signal, the device to which the modulated signal is applied, and the like to those corresponding to the changed modulation scheme. The modulation scheme switching unit 122 can be configured as a part of the function of the digital signal processing circuit 120. For example, the modulation scheme switching unit 122 is configured to switch the modulation scheme in accordance with a type of optical receiver of a communication destination registered in advance. For example, the modulation scheme switching unit 122 may be configured to switch the modulation scheme of the light source 110 in response to an input of a switching operation. In this case, the digital signal processing circuit 120 may include an input device such as a button or a switch that accepts an input of a switching operation of the modulation scheme.

Specifically, when the phase/frequency modulation is designated as a modulation scheme, the modulation scheme switching unit 122 controls a circuit such that the analog modulated signal output from the DA converter 130 (a second modulator) is input to the light source 110. The light source 110 is configured to perform phase/frequency modulation on a bias current in accordance with the input analog modulated signal. Through the phase/frequency modulation on the bias current based on the analog modulated signal, a frequency change and a phase change (generally referred to as a chirp) in the output light of the light source 110 is caused, and the phase/frequency modulation of the light source 110 is realized through the chirp. Since an operation itself in which the light source 110 outputs the continuous light is controlled by such a modulation method, it can be said that the modulation method is a more direct modulation scheme than the intensity modulation to be described below. Hereinafter, for the sake of simplicity, modulating the output light of the light source 110 may be expressed as "modulating the light source 110."

On the other hand, when the intensity modulation is designated as the modulation scheme, the modulation scheme switching unit 122 controls the circuit such that the analog modulated signal output from the DA converter 130 is input to the intensity modulator 140 (a first modulator). In this case, the intensity modulator 140 inputs the analog modulated signal from the DA converter 130 and modulates the output light of the light source 110 through intensity modulation which is based on the input analog modulated signal. Specifically, the intensity modulator 140 inputs the continuous light from the light source 110, and generates an optical modulated signal by modulating the intensity of the received continuous light based on the analog modulated signal. The intensity modulator 140 transmits the generated optical modulated signal to the optical transmission line 30. The intensity modulator 140 is, for example, an electro-absorption (EA) modulator. The intensity modulator 140 may be a Mach-Zehnder modulator.

Figure 2:
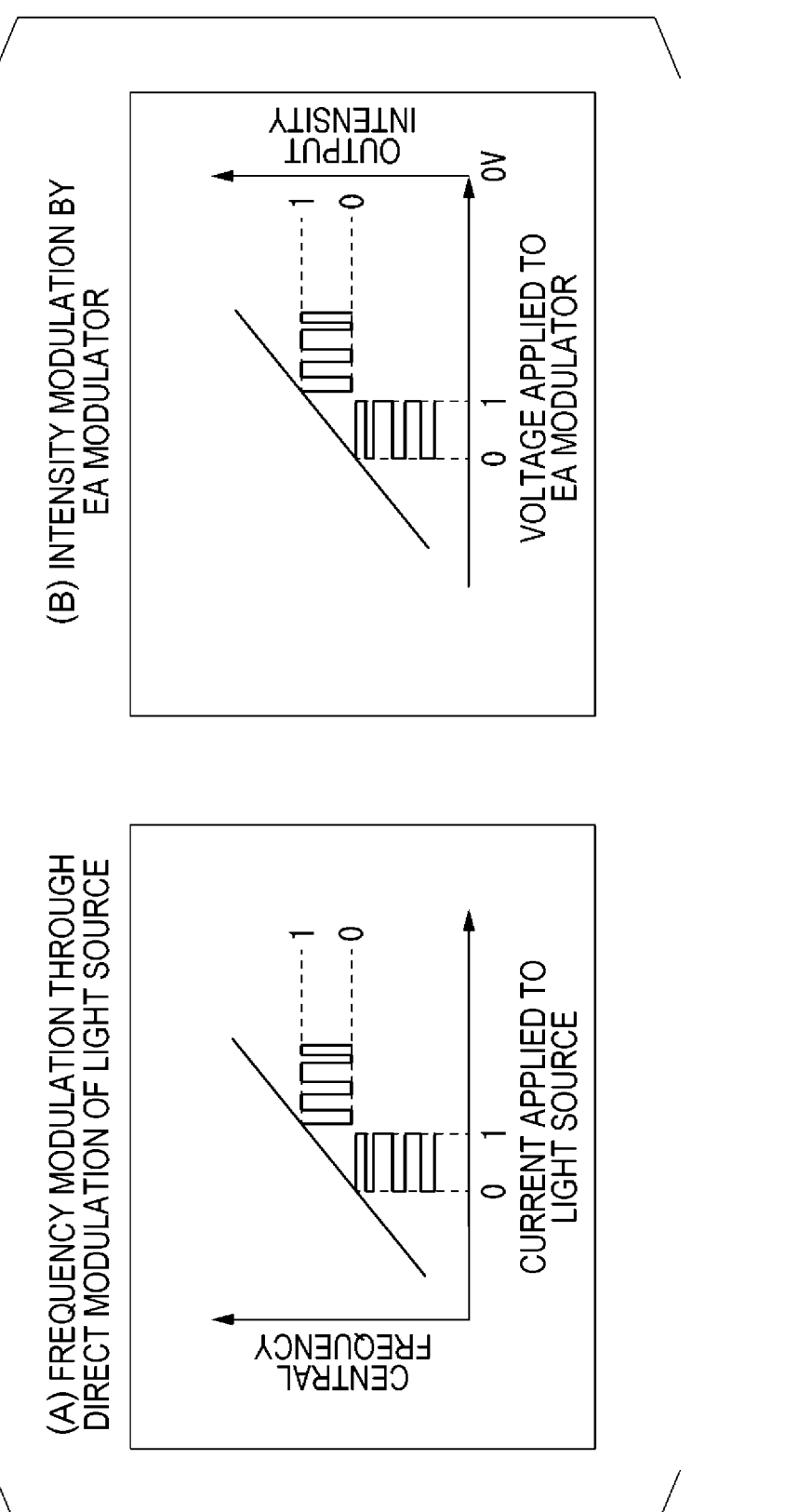
FIG. 2 is an image diagram schematically illustrating switching of a modulation scheme of a light source.

FIG. 2 is an image diagram schematically illustrating switching of the modulation scheme of the light source 110. FIG. 2 (A) illustrates an image of modulation of the light source 110 through the phase/frequency modulation, and FIG. 2 (B) illustrates an image of modulation of the light source 110 through intensity modulation. The example of FIG. 2 illustrates a case where the light source 110 is modulated with an NRZ signal that can take a binary value of 0 or 1.

The optical transmitter 10 which has such a configuration according to the first embodiment can implement the phase/frequency modulation of the light source 110 by modulating the bias current applied to the light source 110 with an analog modulated signal due to the intensity modulator 140 being included, perform the intensity modulation of the light source 110. Therefore, in the optical transmitter 10 according to the first embodiment, it is not necessary to provide separate optical transmitters for the intensity modulation scheme and the phase/frequency modulation scheme, and one optical transmitter 10 can support both the schemes. That is, in the optical transmitter 10 according to the first embodiment, it is possible to improve the degree of freedom in changing the transmission scheme or the transmission parameter in the adaptive modulation of the optical transmission.

Modifications

Figure 3:
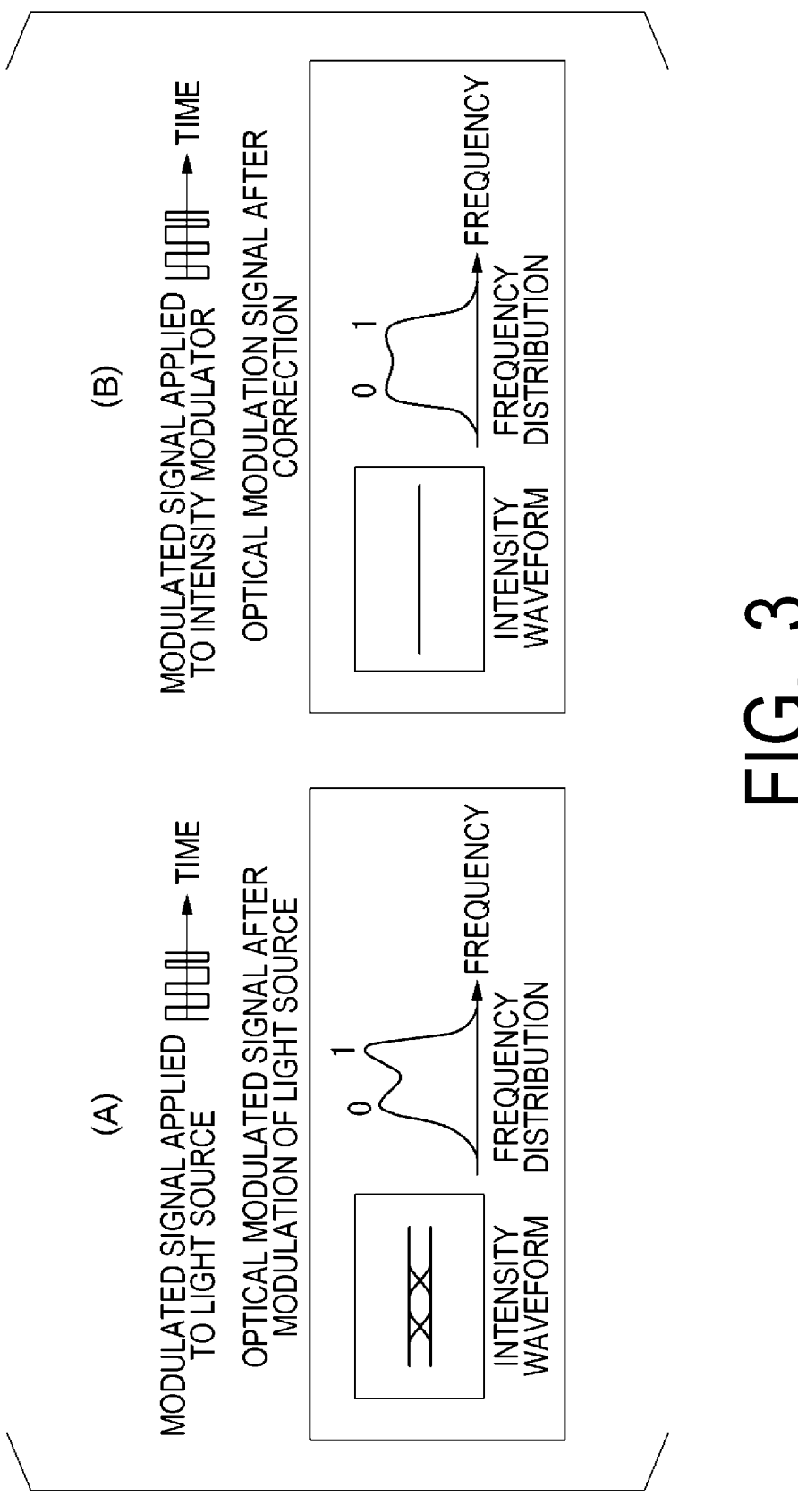
FIG. 3 is an image diagram of correction of an optical modulated signal by an optical transmitter according to a modification.

In the optical transmitter 10 according to the first embodiment, when the light source 110 is modulated through the phase/frequency modulation, not only a phase/frequency modulation component of the analog modulated signal but also an intensity modulation component is applied with the modulation of the bias current of the light source 110. In this case, the optical transmitter 10 may be configured to correct the optical modulated signal so that the intensity modulation component is removed by activating the intensity modulator 140 to perform the modulation in an inverse pattern of a modulation component of the light source 110. FIG. 3 is an image diagram of correction of an optical modulated signal by the optical transmitter 10 according to a modification. FIG. 3(A) is a diagram illustrating the intensity of an optical signal (an optical modulated signal) output from the light source 110 as a result obtained by modulating the bias current applied to the light source 110 with a modulated signal. On the other hand, FIG. 3(B) is a diagram illustrating the intensity of the optical modulated signal corrected by causing the intensity modulator 14 to modulate the optical modulated signal output in FIG. 3 (A) with a modulated signal having a pattern opposite to that of the modulated signal in FIG. 3 (A). With such a configuration, the optical transmitter 10 according to the modification can enhance accuracy of the phase/frequency modulation.

The configuration of the adaptive modulation in the optical transmitter 10 according to the first embodiment may be combined with adaptive modulation of the related art in which the multilevel degree or the type of FEC is changed.

The configuration of the adaptive modulation in the optical transmitter 10 according to the first embodiment may be combined with a configuration in which a chirp is applied to enhance wavelength dispersion resistance by modulating a DFB laser in intensity modulation by an electro-absorption (EA) modulator.

Figure 4:
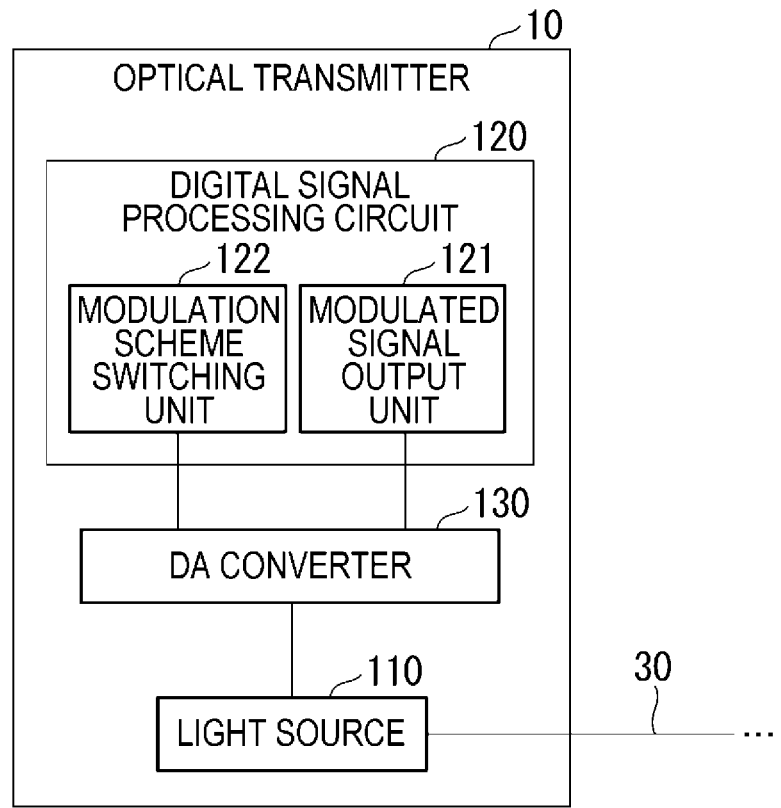
FIG. 4 is a diagram illustrating a configuration example of an optical transmitter according to a modification.
Figure 5:
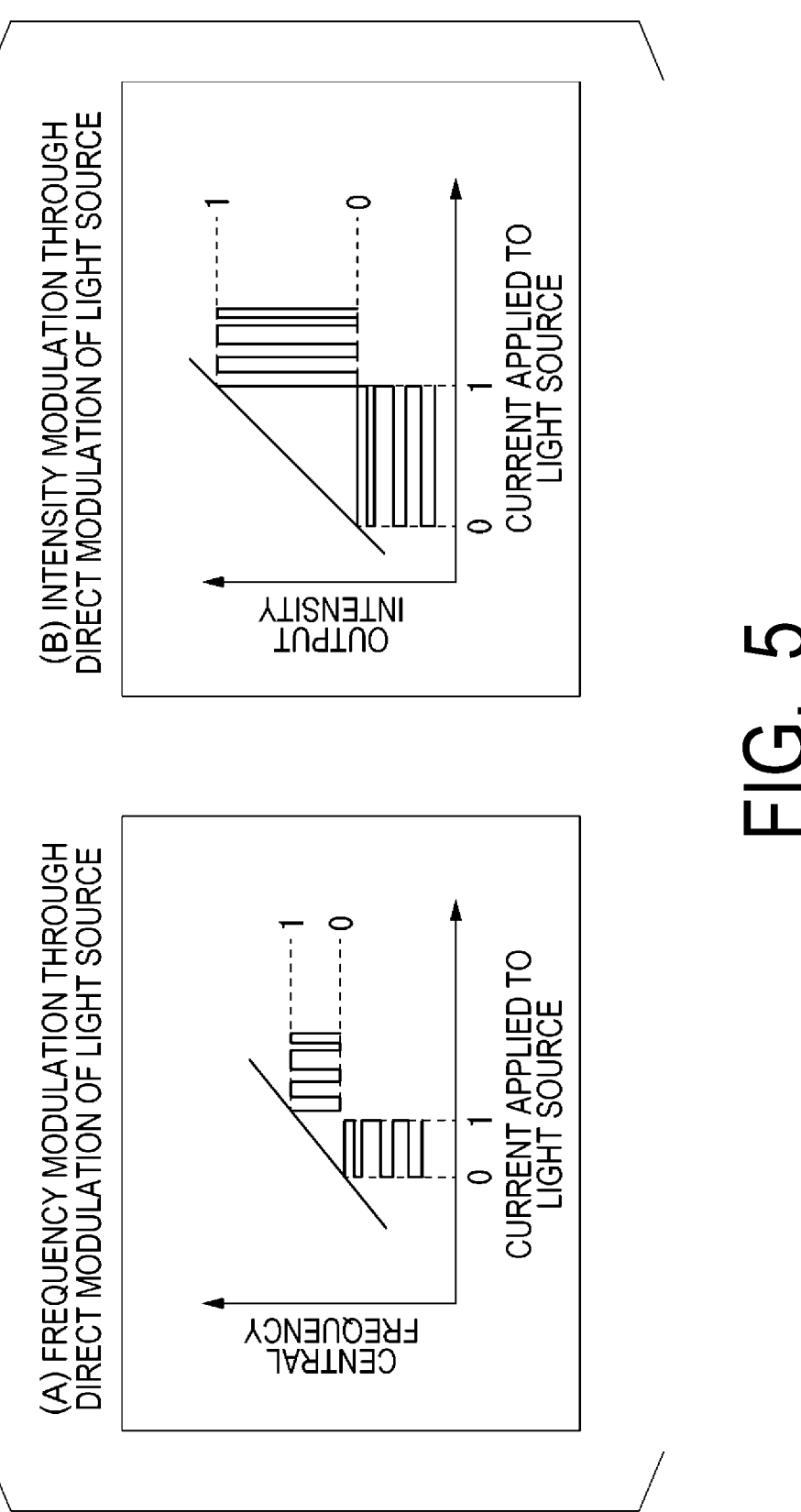
FIG. 5 is an image diagram schematically illustrating switching of a modulation scheme of a light source by an optical transmitter according to a modification.

The optical transmitter 10 according to the first embodiment may be configured to implement phase/frequency modulation and intensity modulation by modulating the bias current of the light source 110. FIG. 4 is a diagram illustrating a configuration example of an optical transmitter 10 according to a modification. The optical transmitter 10 according to the modification is different from the optical transmitter 10 according to the first embodiment in that the intensity modulator 140 is not provided. In this configuration, the phase/frequency modulation and the intensity modulation can be implemented by changing magnitude of the bias current value applied to the light source 110. FIG. 5 is an image diagram schematically illustrating switching of the modulation scheme of the light source 110 by the optical transmitter 10 according to the modification. FIG. 5(A) illustrates an image of phase/frequency modulation, and FIG. 5(B) illustrates an image of intensity modulation. In this case, the modulation scheme switching unit 122 can implement phase/frequency modulation by a method similar to that of the first embodiment. On the other hand, at the time of intensity modulation, the modulation scheme switching unit 122 sets the bias current value to be applied to the light source 110 to a current value larger than that at the time of phase/frequency modulation. As a result, since a desired extinction ratio can be obtained, the modulation scheme switching unit 122 can realize the intensity modulation by modulation of the bias current. That is, the optical transmitter 10 of the modification is configured to modulate the light source 110 by controlling the output operation itself of the light source 110 for both the phase/frequency modulation and the intensity modulation. As described above, according to the optical transmitter 10 of the modification, since the number of portions in which the operation of the circuit can be made common in the phase/frequency modulation and the intensity modulation increases, the optical transmitter 10 can be configured with a smaller circuit scale.

Figure 6:
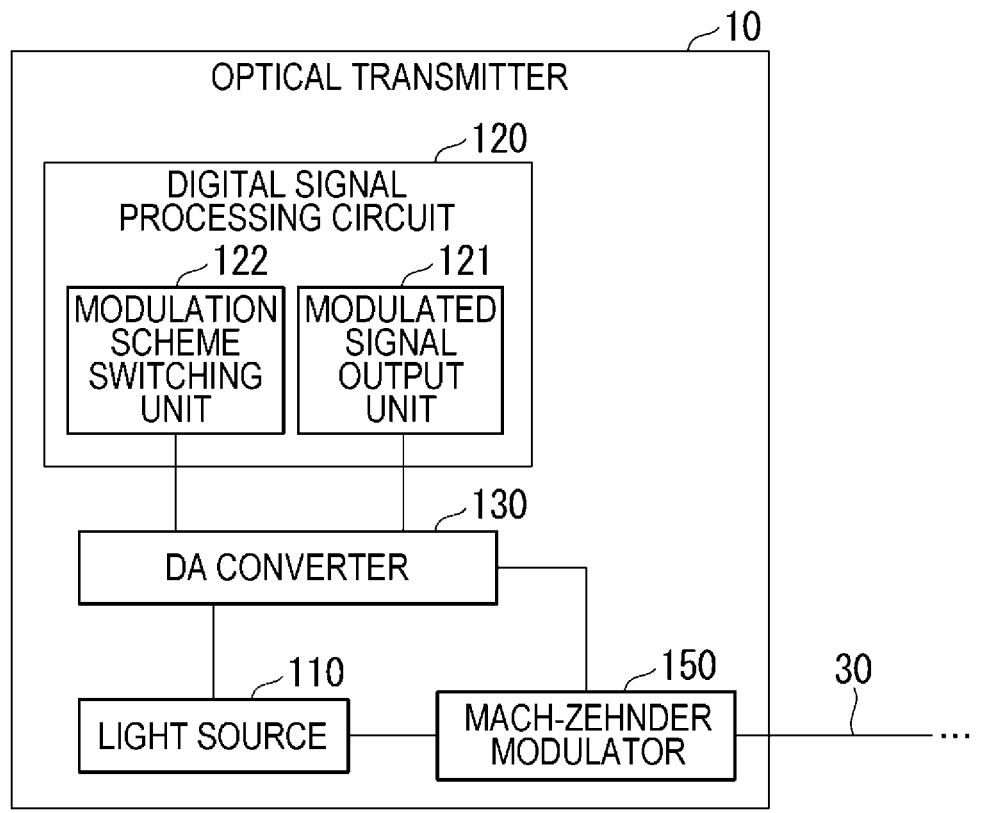
FIG. 6 is a diagram illustrating a configuration example of an optical transmitter according to a modification.
Figure 7:
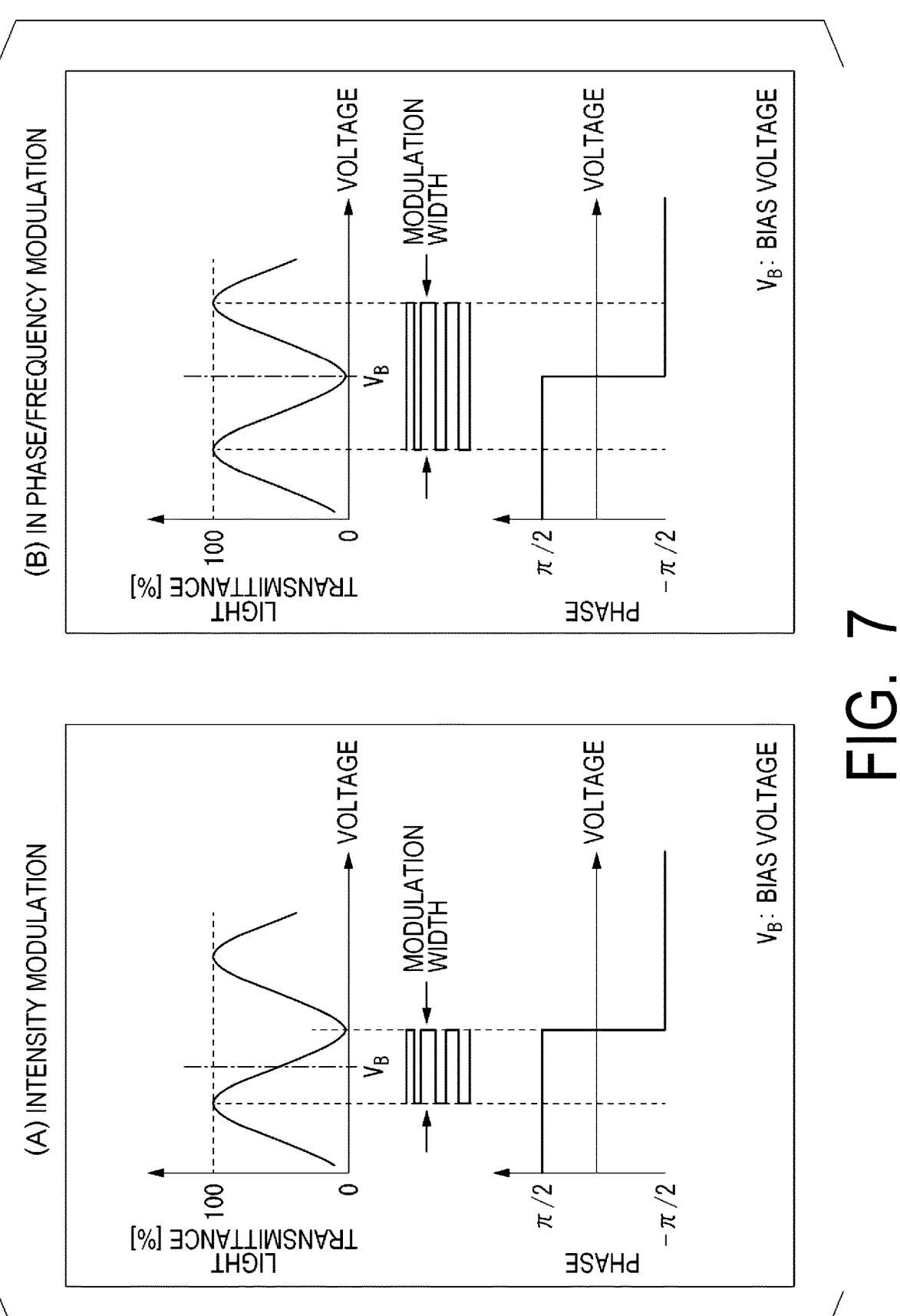
FIG. 7 is an image diagram schematically illustrating a switching outline of a modulation scheme of a light source by an optical transmitter according to a modification.

In addition, the optical transmitter 10 of the first embodiment may be configured to include a Mach-Zehnder modulator 150 instead of the intensity modulator 140. FIG. 6 is a diagram illustrating an exemplary configuration of an optical transmitter 10 according to a modification. In this configuration, the optical transmitter 10 can realize the intensity modulation and the phase modulation of the light source 110 by changing the bias voltage and the modulation amplitude applied to the Mach-Zehnder modulator 150. FIG. 7 is an image diagram schematically illustrating switching of the modulation scheme of the light source 110 by the optical transmitter 10 according to a modification. FIG. 7(A) illustrates an image of intensity modulation, and FIG. 7(B) illustrates an image of phase modulation. In the case of the intensity modulation, the Mach-Zehnder modulator 150 has an extinction characteristic which changes sinusoidally with respect to a voltage. In the case of binary intensity modulation, a bias voltage and an amplitude of the modulated signal are determined from a point at which light transmittance is 100% to a point at which the light transmittance is 0%. At this time, there is no change in the output phase. On the other hand, in phase modulation, a bias voltage and an amplitude of the modulated signal are determined from a point where the light transmittance is 100% to a next point where the light transmittance is the 100%. Accordingly, the phase is changed by 180 degrees. The configuration of the adaptive modulation in the optical transmitter 10 according to the modification may be combined with the adaptive modulation of the related art in which the multilevel degree or the type of FEC is changed. In the configuration according to such a modification, it is possible to transmit the multilevel intensity modulated signal and to add a multilevel intensity modulation component to the binary phase modulation for transmission. The Mach-Zehnder modulator 150 may be an IQ modulator capable of modulating both I and Q axes. In this case, the Mach-Zehnder modulator 150 can transmit the intensity modulated signal by modulating both the I and Q axes with the same signal, the same bias, and the same amplitude.

Second Embodiment

Figure 8:
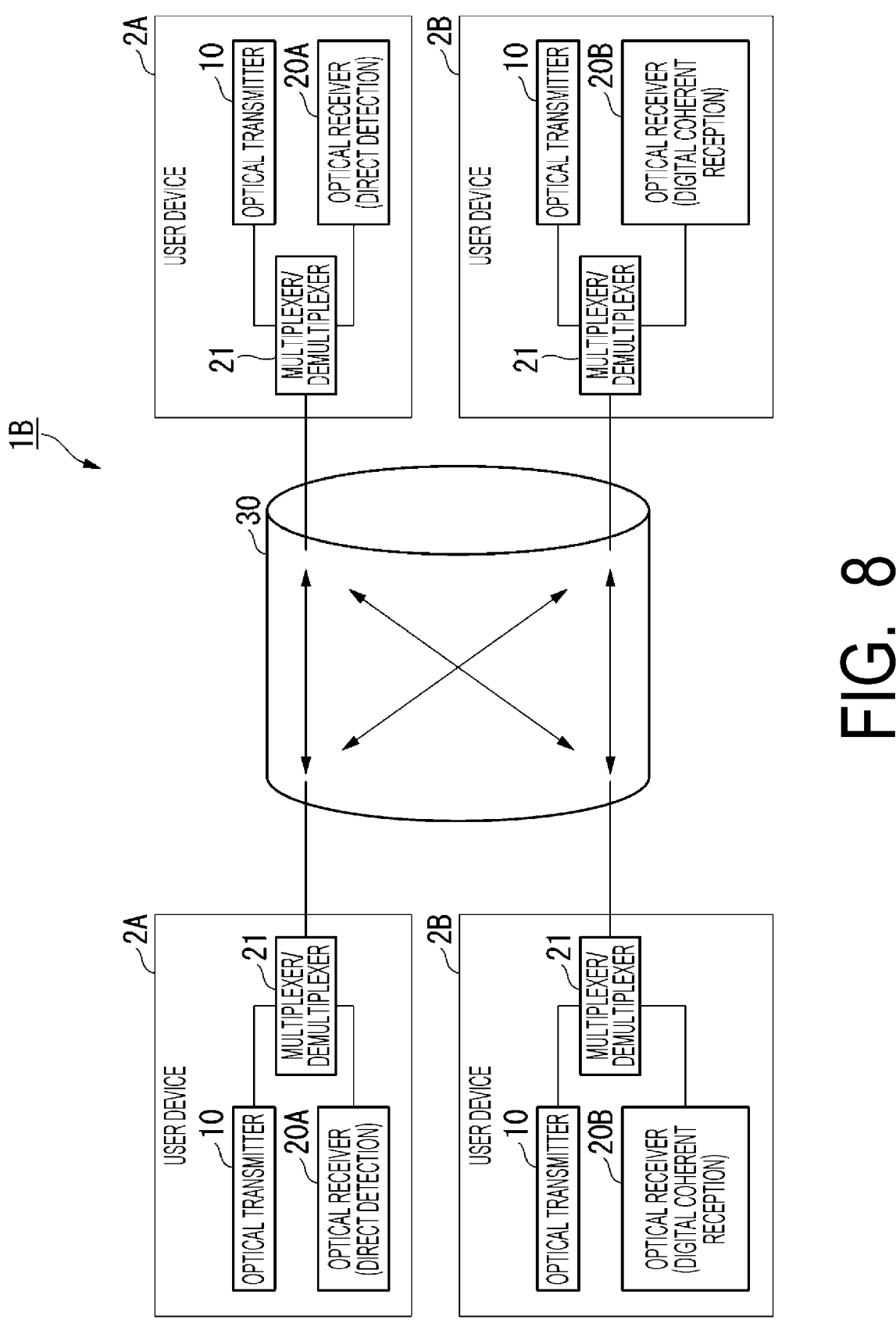
FIG. 8 is a diagram illustrating a configuration example of an optical transmission system according to a second embodiment.

FIG. 8 is a diagram illustrating a configuration example of an optical transmission system 1B according to a second embodiment. The optical transmission system 1 is a system in which user devices including the optical transmitter 10 according to the first embodiment communicate with each other. Here, as a configuration of the user device including the optical transmitter 10 according to the first embodiment, two types of configurations of user devices 2A and 2B illustrated in FIG. 8 are assumed. The user device 2A includes an optical receiver 20A that receives an optical signal in accordance with a direct detection scheme, and the user device 2B includes an optical receiver 20B that receives an optical signal in accordance with a digital coherent detection scheme. The multiplexer/demultiplexer 21 multiplexes and demultiplexes optical signals having different wavelengths in transmission and reception of optical signals, and inputs and outputs the multiplexed optical signals.

In order to perform communication between these user devices 2, it is necessary to determine which modulation scheme of the intensity modulation or the phase/frequency modulation is used to exchange optical signals at start of communication (negotiation). For example, as a configuration for implementing negotiation, a configuration in which the user devices 2 sequentially transmit a signal of intensity modulation and a signal of phase/frequency modulation and mutually notify which modulation scheme has been used for reception is considered. It is assumed that negotiation exchange is performed by a scheme similar to a general initial authentication phase when a communication connection is established, such as negotiation of a communication mode in Ethernet (registered trademark) or three-way handshake in Transmission Control Protocol (TCP), for example.

In the optical transmission system 1 that has such a configuration according to the second embodiment, the user devices 2 can determine by negotiation at the start of communication whether to transmit or receive the optical signal in accordance with a modulation scheme of either the intensity modulation or the phase/frequency modulation. That is, in the optical transmission system 1 according to the second embodiment, each user device 2 can determine a modulation scheme in accordance with a transmission path with the user device of a communication partner by transmitting and receiving a main signal, and can adaptively switch the modulation scheme with respect to a change in the transmission path for communication. Therefore, it is possible to improve the degree of freedom of a change in the transmission scheme or the transmission parameter in the adaptive modulation of the optical transmission.

Third Embodiment

Figure 9:
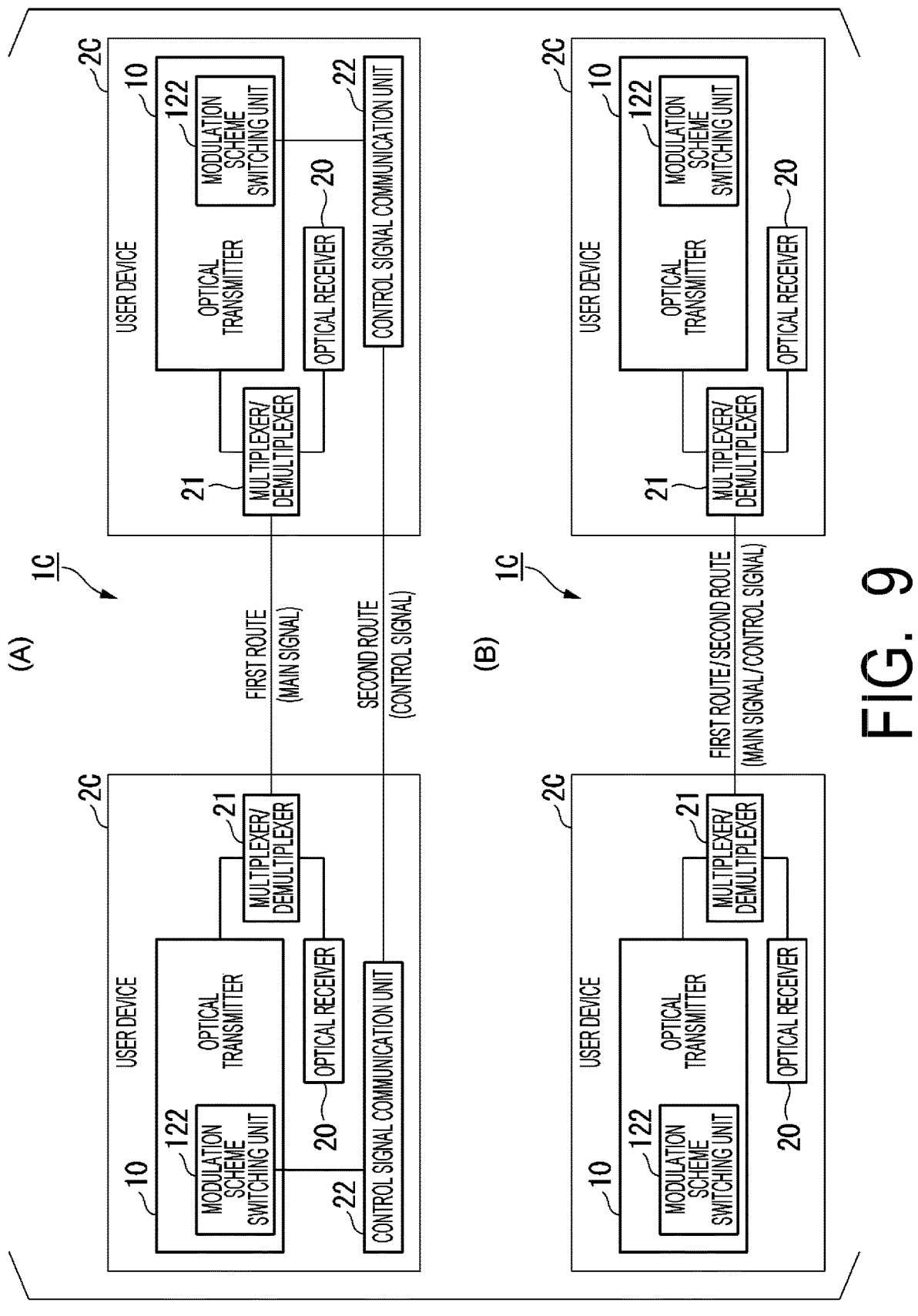
FIG. 9 is a diagram illustrating a configuration example of an optical transmission system according to a third embodiment.

FIG. 9 is a diagram illustrating a configuration example of an optical transmission system 1C according to a third embodiment. The optical transmission system 1B according to the second embodiment has a configuration in which negotiation is performed in the initial authentication phase using communication of a main signal. In the optical transmission system 1C according to the third embodiment, however, each user device 2C includes a transmission path of a control signal (hereinafter referred to as a "second path") separately from the transmission path of a main signal (hereinafter referred to as a "first path"), and exchanges information (hereinafter referred to as "control information".) such as a loss (a path loss) of the optical signal in the transmission path with the user device 2C of a communication destination and a configuration of the optical receiver in the user device 2C of the communication destination via the second path. In the optical transmission system 1C according to the third embodiment, the user device 2C determines the modulation scheme based on the control information of which the user device 2C of the communication destination notifies.

Specifically, in this case, each user device 2C includes a control signal communication unit 22 in addition to the optical transmitter 10, the optical receiver 20, and the multiplexer/demultiplexer 21 according to the first embodiment. The control signal communication unit 22 transmits and receives a signal indicating control information (a control signal) via the second path. For example, the second path may be configured as a network physically different from the first path as illustrated in FIG. 9(A) or may be configured as a transmission path logically different from the first path by using a network which is physically the same as the first path as illustrated in FIG. 9(B).

For example, in the example of FIG. 9(B), the second path may be configured as another channel using an independent wavelength different from the first path in the optical transmission line used as the first path, or may be configured as a pseudo-control channel realized by an auxiliary management and control channel (AMCC) that enables transmission of a control signal within a wavelength range of the main signal.

In the optical transmission system 1C that has such as a configuration according to the third embodiment, each user device 2C can negotiate a modulation scheme using the second path physically or logically independent from the first path for transmitting the main signal. That is, in the optical transmission system 1C according to the third embodiment, each user device 2C recognizes the configuration of the transmission path with the control signal transmitted and received with each other, and thus can adaptively switch the modulation scheme with respect to a change in the transmission path and perform communication. Therefore, it is possible to improve the degree of freedom of a change in the transmission scheme or a transmission parameter in the adaptive modulation of the optical transmission.

Modifications

In the optical transmission system 1C according to the third embodiment, information (hereinafter referred to as "communication destination information") indicating a user device of a communication destination may be registered in advance in each user device 2C. In this case, the modulation scheme switching unit 122 of the optical transmitter 10 may be configured to determine a modulation scheme of the optical transmitter 10 based on the communication destination information registered in advance. In this case, since it is not necessary to transmit and receive a control signal for determining the modulation scheme, the second path can be omitted in the optical transmission system 1C, and thus it is possible to simplify the system configuration.

Fourth Embodiment

Figure 10:
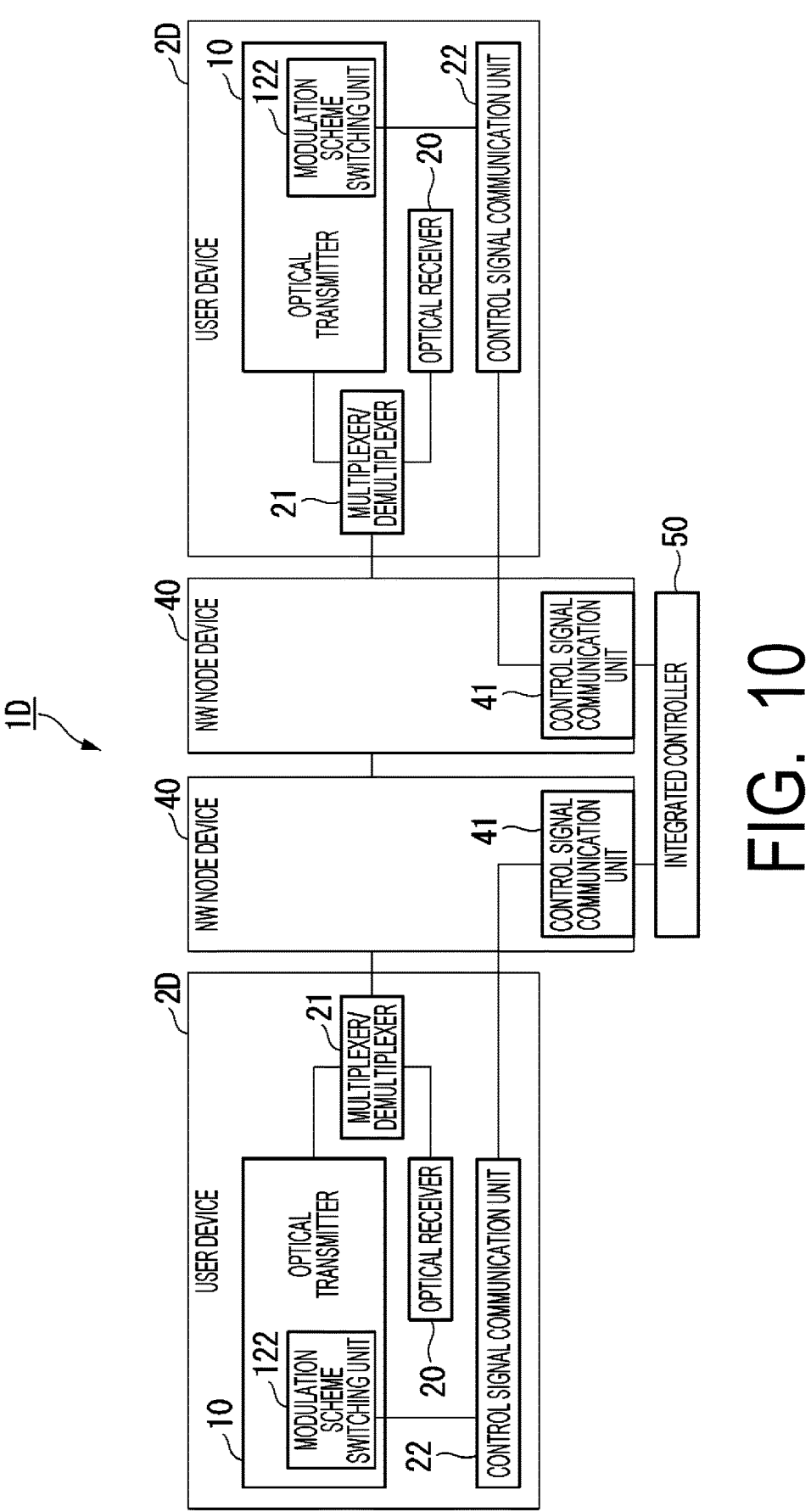
FIG. 10 is a diagram illustrating a configuration example of an optical transmission system according to a fourth embodiment.

FIG. 10 is a diagram illustrating a configuration example of an optical transmission system 1D according to a fourth embodiment. In the optical transmission system 1B according to the second embodiment and the optical transmission system 1C according to the third embodiment, the user devices 2 are directly connected and communicate with each other. On the other hand, in the optical transmission system 1D according to the fourth embodiment, each user device 2D communicates via a network node device (hereinafter referred to as an "NW node device") 40. The user device 2D is different from the user device 2C according to the third embodiment in that the user device 2D performs direct communication with the network node device 40, but a basic configuration is similar to that of the user device 2C. The NW node device 40 is a device that transfers optical communication by an optical switch. The communication between the user devices 2D is implemented by one or more NW node devices 40 transferring the communication. The integrated controller 50 is a device that integrally controls one or more NW node devices 40.

In this case, each user device 2D negotiates a modulation scheme with the NW node device 40 to which the user device 2D is connected. Specifically, each NW node device 40 includes a control signal communication unit 41 similar to the control signal communication unit 22 of the user device 2D. In each user device 2, the control signal communication unit 22 communicates with the control signal communication unit 41 of the NW node device 40 to notify the NW node device 40 of the control information of each user device 2 and acquire control information of the user device 2D of a communication destination from the NW node device 40. In each user device 2D, the modulation scheme switching unit 122 of the optical transmitter 10 determines the modulation scheme in the communication with the user device 2D of the communication destination based on the control information acquired from the NW node device 40, and switches the modulation scheme.

On the other hand, in the NW node device 40, the control signal communication unit 41 supplies the control signal input from the user device 2D of a negotiation partner to the integrated controller 50 and outputs the control signal with regard to the control information of the communication destination user device 2D of the user device 2D to the user device 2D of the negotiation partner. Here, the control signal communication unit 41 of each NW node device 40 has a function of sharing the control information acquired from each user device 2D via the integrated controller 50. With this function of sharing the control information, the user device 2D can acquire the control information of the communication destination user device 2D from the NW node device 40 to which the user device 2D is connected and can determine a modulation scheme in communication with the user device 2D of the communication destination through negotiation with the directly connected NW node device 40.

Fifth Embodiment

Figure 11:
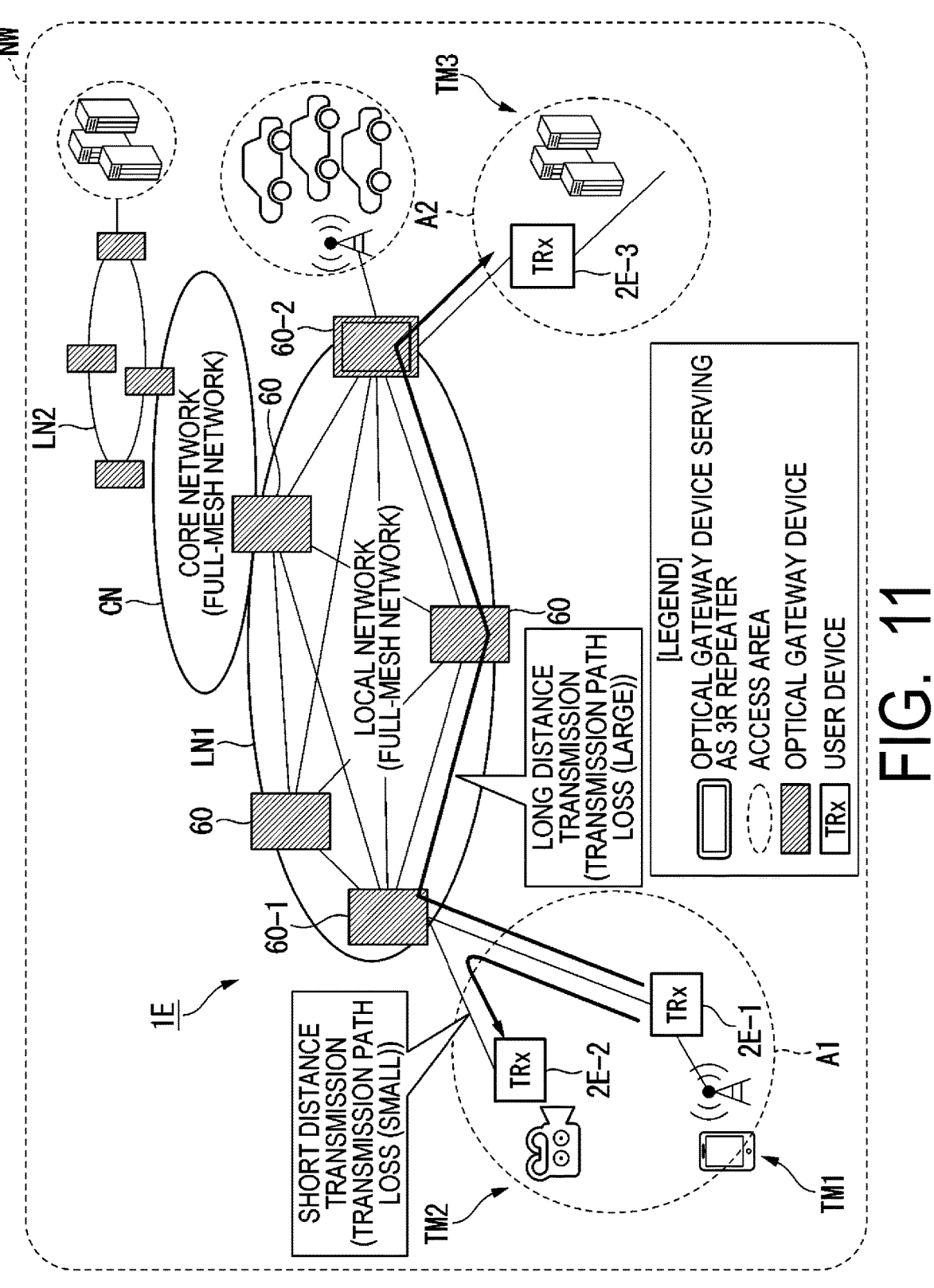
FIG. 11 is a diagram illustrating a configuration example of an optical transmission system according to a fifth embodiment.

FIG. 11 is a diagram illustrating a configuration example of an optical transmission system 1E according to a fifth embodiment. As illustrated in FIG. 11, an optical transmission system 1E according to the fifth embodiment is applied to an APN network NW including a first access area A1, a second access area A2, local networks LN1 and LN2, and a core network CN. Here, the first access area A1 and the second access area A2 indicate a range of a service area accommodating terminals of end users via the user device 2E. For example, the first access area A1 includes a user device 2E-1 that connects a mobile communication terminal TM1 such as a smartphone or a mobile phone in a wireless manner, and a user device 2E-2 that connects a device TM2 such as a broadcasting device in a wired manner. For example, the second access area A2 includes a user device 2E-3 that connects a server device group TM3 or the like installed in a data center or the like in a wired manner. Here, it is assumed that the optical receiver 20 of each user device 2E detects an optical signal in accordance with the direct detection scheme.

The configurations of the first access area A1 and the second access area A2 illustrated in FIG. 11 are an example, and the access area is not limited to the illustrated device and may connect any device. The APN network NW may be configured to include one access network, or may be configured to include three or more access networks.

The local networks LN1 and LN2 are networks accommodating devices in corresponding access areas. The core network CN is a network accommodating the local networks LN1 and LN2. For simplicity, FIG. 11 illustrates a case where the core network CN accommodates two local networks LN1 and LN2, but the core network CN may accommodate one local network or three or more local networks.

For example, the local network LN1 may be configured as a full-mesh network by a plurality of optical gateway devices 60 (photonic gateway (Ph-GW)). In this case, in the local network LN1, the optical gateway device 60-1 accommodating the first access area A1 and the optical gateway device 60-2 accommodating the second access area A2 can perform long distance communication by relaying communication via an arbitrary transfer path. In such a local network LN1, in order to improve the SNR deteriorating in the optical transmission line 30, the optical gateway device 60 serving as a transmission destination may be configured as a 3R repeater.

Figure 12:
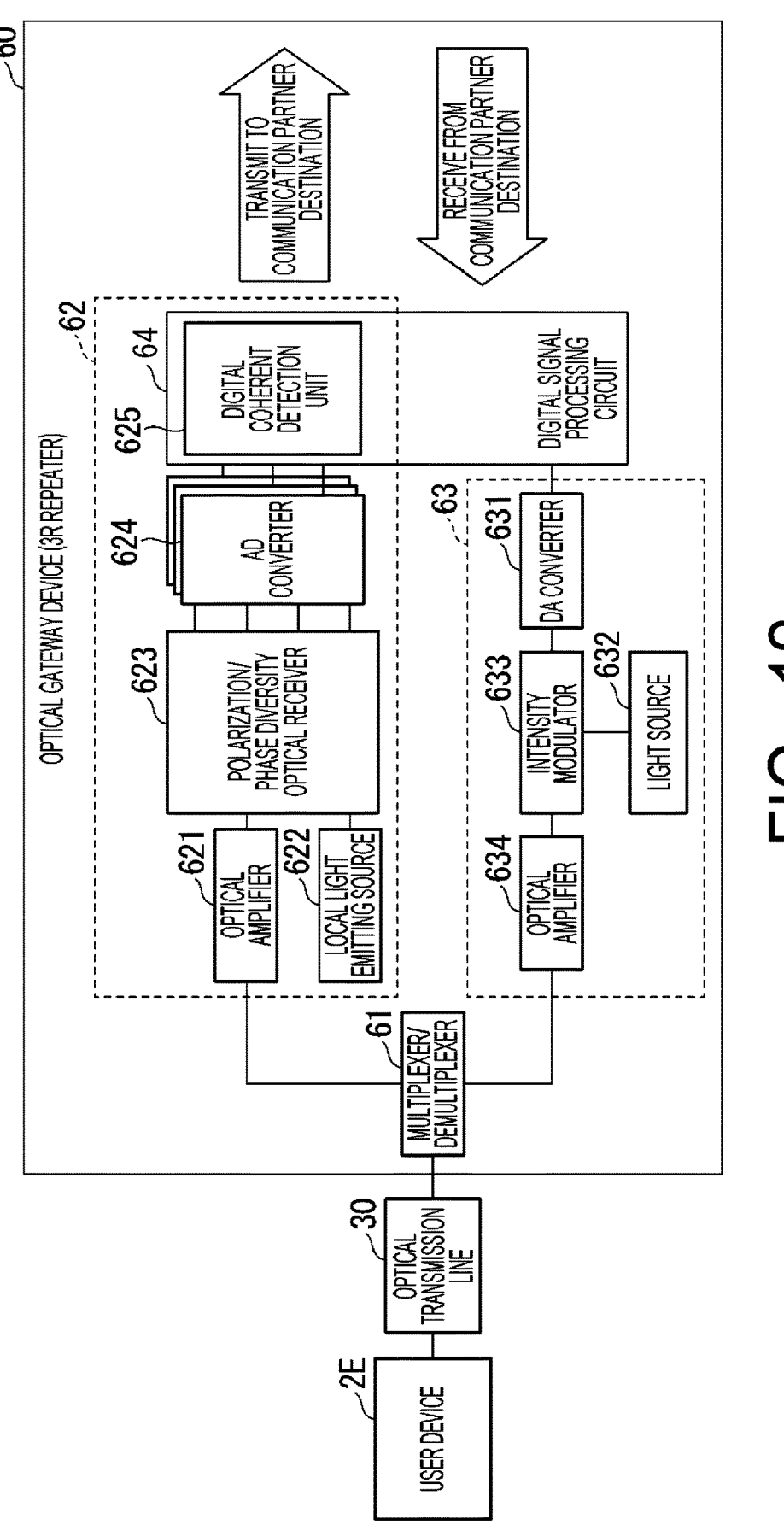
FIG. 12 is a diagram illustrating a configuration example of connection between a user device and an optical gateway device which is a 3R repeater.

FIG. 12 is a diagram illustrating a configuration example of connection between the user device 2E and the optical gateway device 60 serving as a 3R repeater. For example, the user device 2E illustrated in FIG. 12 is the user device 2E-3 in the long distance communication in FIG. 12, and the optical gateway device 60 as the 3R repeater illustrated in FIG. 12 is the optical gateway device 60-2 in the long distance communication in FIG. 12.

In this case, the optical gateway device 60 includes, for example, a multiplexer/demultiplexer 61 that inputs and outputs an optical signal to and from the optical transmission line 30, an optical receiver 62 that demodulates an optical signal of upstream communication by phase/frequency modulation, an optical transmitter 63 that modulates an optical signal of downstream communication by intensity modulation, and a digital signal processing circuit 64 that performs digital signal processing on the optical signal. As the multiplexer/demultiplexer 61, a device that has small wavelength dependency such as a splitter or a circulator and a device that performs multiplexing/demultiplexing in accordance with a communication wavelength band such as a wavelength demultiplexing filter are assumed.

The optical receiver 62 includes, for example, an optical amplifier 621, a local light emitting source 622, a polarization/phase diversity optical receiver 623, an AD converter 624, and a digital coherent detection unit 625. The digital coherent detection unit 625 is implemented by the digital signal processing circuit 120 and detects an optical signal in conformity with a digital coherent detection scheme. The optical transmitter 63 includes, for example, a DA converter 631, a light source 632, an intensity modulator 633, and an optical amplifier 634. Hereinafter, the optical gateway device 60 configured as a 3R repeater may be referred to as a "3R repeater 60" in some cases.

In contrast to the 3R repeater 60 that has such a configuration, the optical transmitter 10 of the user device 2E is configured to communicate with the optical receiver 62 of the 3R repeater 60 in conformity with a phase/frequency modulation scheme. Accordingly, in upstream communication, the 3R repeater 60 can perform reception with high sensitivity. On the other hand, as described above, since it is assumed here that the user device 2E detects the optical signal in conformity with the direct detection scheme, it is assumed that the optical receiver 20 is configured to communicate with the optical transmitter 63 of the 3R repeater 60 in conformity with an intensity modulation scheme.

In this case, the reception sensitivity of the optical receiver 20 of the user device 2E in the downstream communication is assumed to be lower than the reception sensitivity of the optical receiver 62 of the 3R repeater 60 in the upstream communication. In order to reduce such a difference in reception sensitivity and equalize transmission path losses allowed in the uplink communication and the downlink communication, the 3R repeater 60 may be configured to improve the intensity of the output light by the optical amplifier 634. For example, when the difference between the reception sensitivities of the upstream communication and the downstream communication is A [dB], a gain of the optical amplifier 634 may be adjusted such that the intensity of the output light of the optical transmitter 63 is higher than the intensity of the output light of the upstream communication by A [dB].

For a digital coherent optical receiver currently used in a core network or the like, it is assumed that a pre-optical amplifier is applied for high-sensitivity reception. Therefore, in the optical transmission system 1E according to the fifth embodiment, the pre-optical amplifier may also be disposed at the front stage of the digital signal processing circuit 64 of the 3R repeater 60.

In the configuration of long distance communication, the modulation scheme can be determined in accordance with a negotiation method similar to that of the fourth embodiment. In the user device 2E or the 3R repeater 60, when information regarding a connection destination device is registered in advance, the modulation scheme may be determined based on the registration information.

On the other hand, when the user devices 2E belonging to the same access area network communicate with each other, the optical gateway device 60 accommodating the access area network functions as an optical switch, and short distance communication can be performed by turning back the communication of the user device 2E. For example, in the example of FIG. 11, communication of the user device 2E-2 with the user device 2E-2 serving as a communication destination is turned back to the user device 2E-1 by the optical gateway device 60-1.

Figure 13:
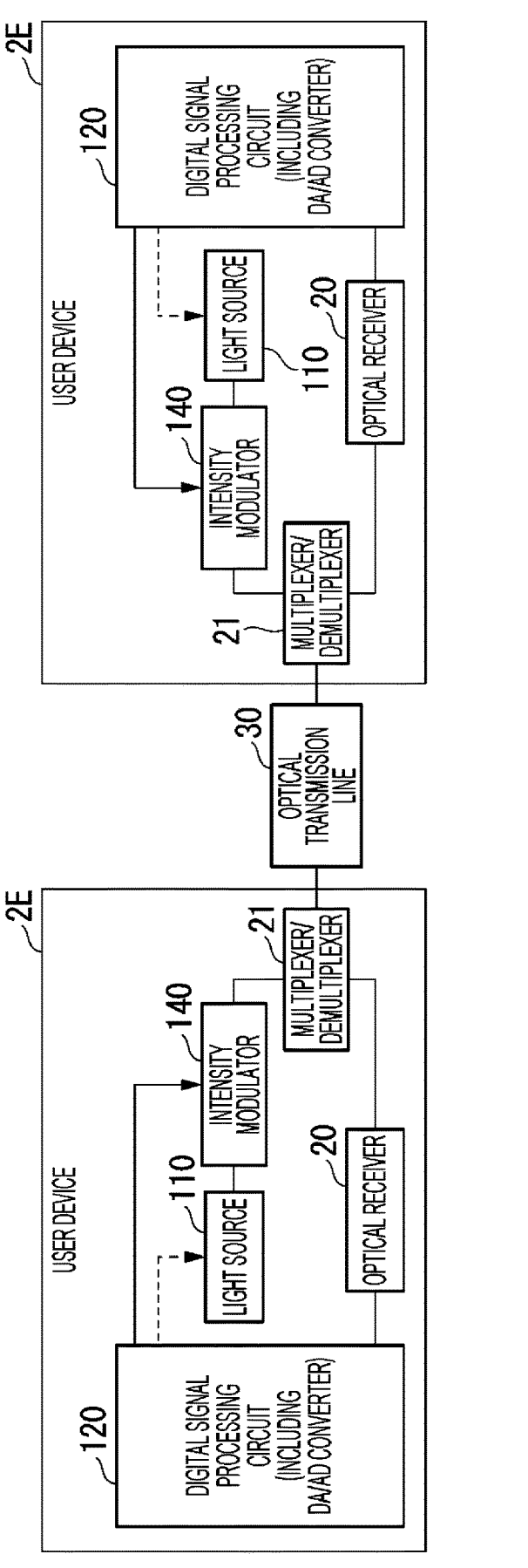
FIG. 13 is a diagram illustrating a configuration example related to short distance communication between the optical gateway device and the user device.
Figure 14:
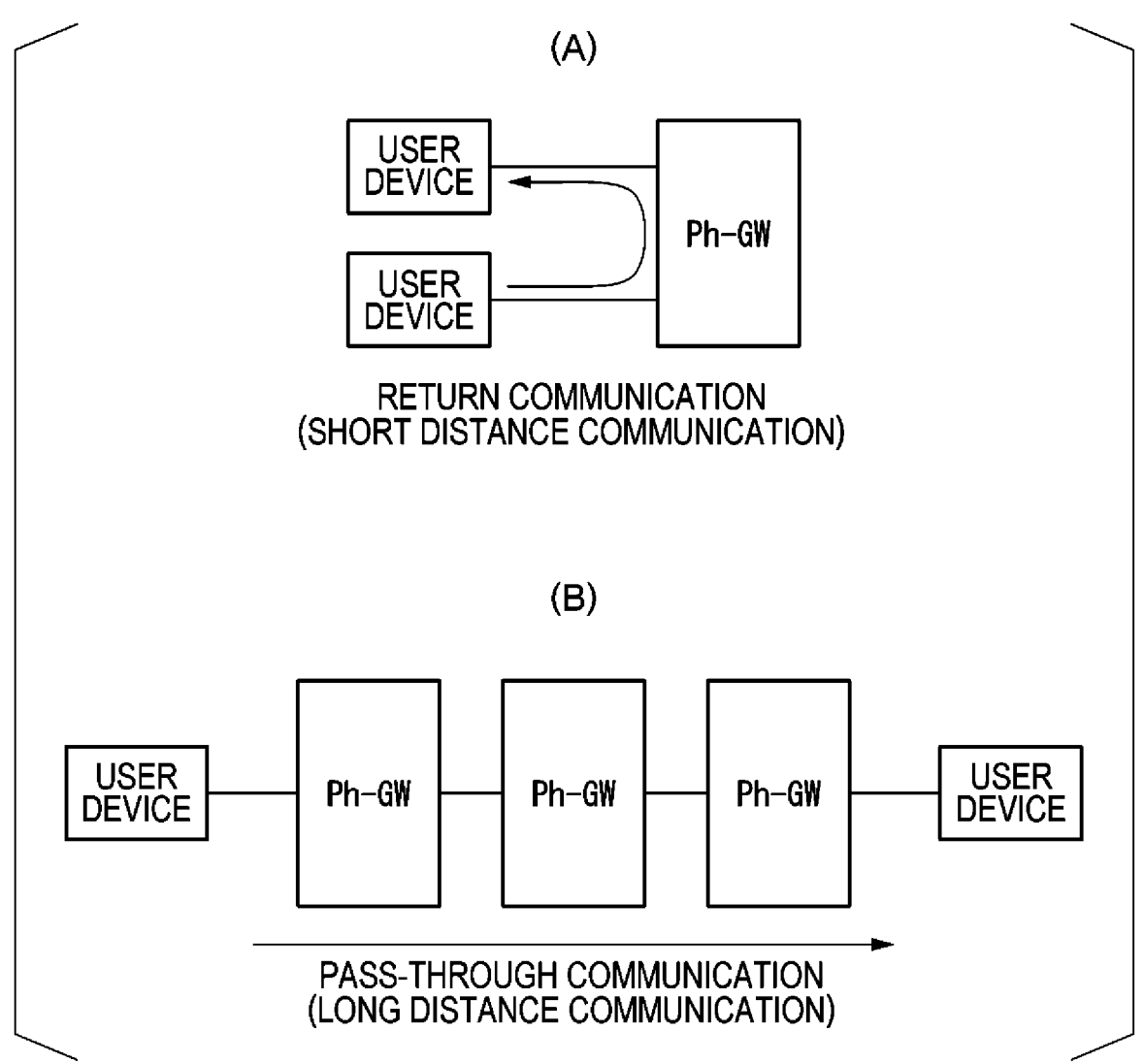
FIG. 14 illustrates a configuration example of communication in an all photonics network (APN) of an innovative optical and wireless network (IOWN).
Figure 15:
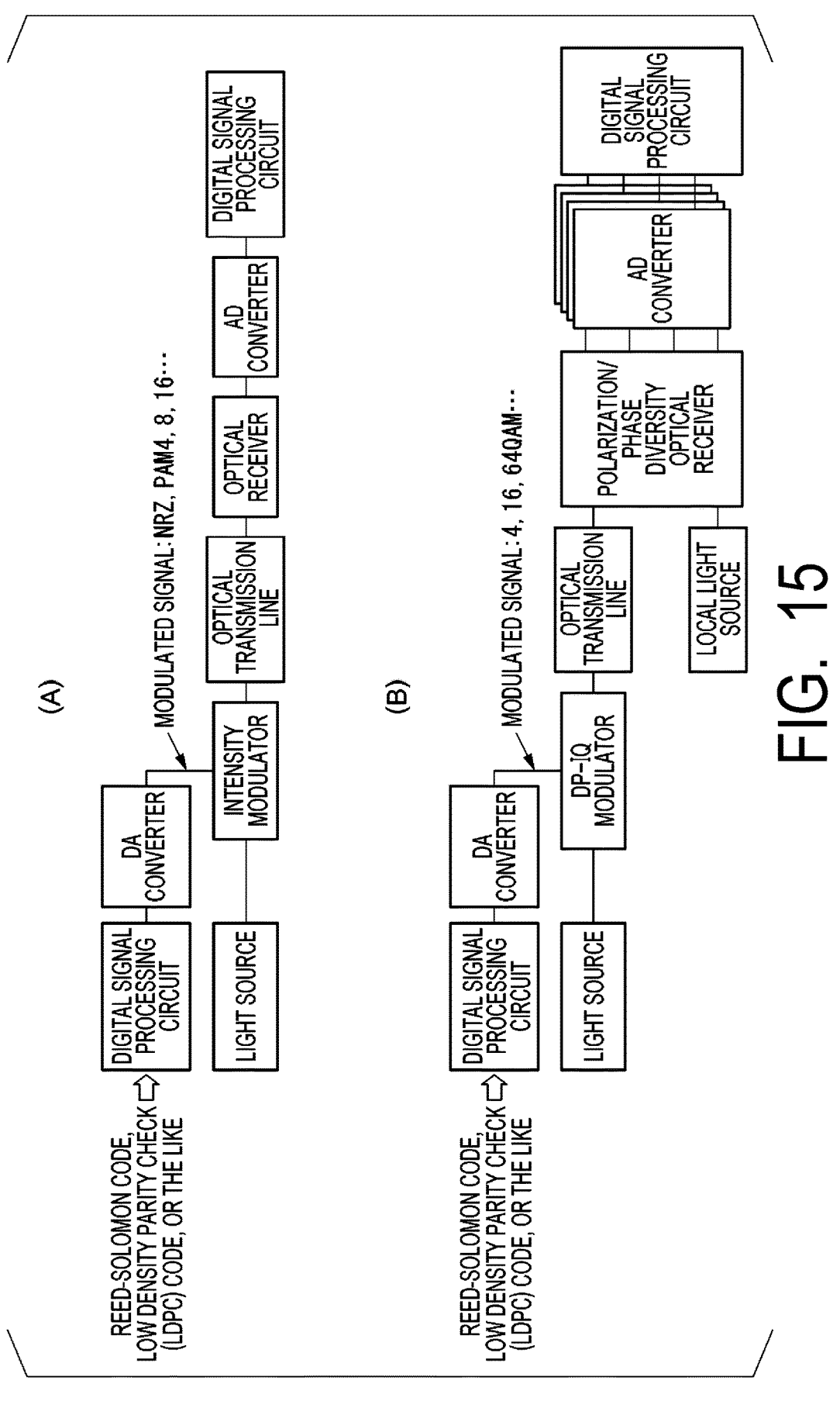
FIG. 15 is a diagram schematically illustrating a configuration of an optical transmission system according to a technology of the related art.

FIG. 13 is a diagram illustrating a configuration example related to short distance communication between user devices 2E via the optical gateway device 60. As described above, in the short distance communication inside the same access network, the communication of the user device 2E is turned back by the optical switch function of the optical gateway device 60. Therefore, connection configurations between the user devices 2E are directly connected via the optical transmission line 30, as illustrated in FIG. 13. The digital signal processing circuit 120 in FIG. 13 includes a DA converter and an AD converter for transmission and reception. That is, in the short distance communication, each user device 2E can determine the modulation scheme in accordance with a negotiation method similar to that of the third embodiment. In this case, when the information regarding the connection destination device is registered in advance in each user device 2E, the modulation scheme may be determined based on the registration information.

In the optical transmission system 1E that has such a configuration according to the fifth embodiment, for example, when a transmission path loss is small during the turned back communication in the optical gateway device 60 in the APN, it is possible to perform direct communication between the user devices 2E. When the transmission path loss is large, it is possible to transfer the communication via the network of the optical gateway device 60, amplify the optical signal by the 3R repeater 60, and relay the communication to the user device 2E of the communication partner.

Modification

In the optical transmission system 1E according to the fifth embodiment, a Mach-Zehnder modulator may be used instead of the intensity modulator.

In the optical transmitter 10 or the optical transmission system 1E of the above-described embodiment, different optical transmitters (intensity modulators, dual polarization in-phase quadrature modulators (DP-IQ modulator)) have been required for each modulation scheme in the related art. However, by changing a signal to be applied to a modulation element, a bias value of the signal, and an amplitude according to a desired modulation scheme, it is possible to switch between intensity modulation and phase/frequency modulation only by the intensity modulator. Accordingly, in the optical transmitter 10 or the optical transmission system 1E according to the embodiment, it is possible to realize an economical optical transmitter capable of communicating with the optical receivers of both the direct detection scheme and the digital coherent reception scheme by the same optical transmitter.

Although the embodiments of the present invention have been described in detail with reference to the drawings, specific configurations are not limited to the embodiments, and include design and the like within the scope of the present invention without departing from the gist of the present invention.

INDUSTRIAL APPLICABILITY

The present invention is applicable to a transmission device, a reception device, or an optical transmission system that performs communication via an optical transmission line.

REFERENCE SIGNS LIST

1 Optical transmission system
2 User device
10 Optical transmitter
110 Light source
120 Digital signal processing circuit
121 Modulated signal output unit
122 Modulation scheme switching unit
130 DA converter
140 Intensity modulator
150 Mach-Zehnder modulator
20 Optical receiver
21 Multiplexer/demultiplexer
22 Control signal communication unit
30 Optical transmission line
40 Network node device.
41 Control signal communication unit
50 Integrated controller
60 Optical gateway device
61 Multiplexer/demultiplexer
62 Optical receiver
621 Optical amplifier
622 Local light emitting source
623 Polarization and phase diversity optical receiver
624 AD converter
625 Digital coherent detection unit
63 Optical transmitter
631 DA converter
632 Light source
633 Intensity modulator
634 Optical amplifier
64 Digital signal processing circuit

The invention claimed is:

1. An optical transmitter comprising:
a first modulator configured to generate an optical modulated signal through intensity modulation of an optical signal;
a second modulator configured to generate an optical modulated signal through phase/frequency modulation of the optical signal; and
a modulation scheme switcher configured to switch a modulator of the optical signal to one of the first and second modulators,
wherein the modulation scheme switcher switches the modulator to a modulator corresponding to a device of a connection destination between the first and second modulators,
the second modulator realizes phase/frequency modulation of the optical signal by modulating a bias current to be applied to a light source that emits the optical signal to a modulated signal related to the modulator, and
the first modulator realizes intensity modulation of the optical signal by applying a bias current at a current value larger than a bias current applied to the light source by the second modulator.

2. The optical transmitter according to claim 1, wherein the first modulator realizes intensity modulation of the optical signal by an electro-absorption modulator or a Mach-Zehnder modulator.

3. The optical transmitter according to claim 1, wherein the communication scheme switcher determines, by negotiation, a modulation scheme to be used for communication with the device of the connection destination during initial communication with the device of the connection destination.

4. An optical transmission system comprising:
one or more user devices including the optical transmitter according to claim 3 and an optical receiver configured to detect an optical signal in conformity with a direct detection scheme or a digital coherent detection scheme;
one or more network node devices accommodating the one or more user devices; and
a route control device configured to control a communication route formed by the one or more network node devices,
wherein the optical transmitter exchanges information related to the negotiation performed with a user device of a communication partner via the route control device.

5. The optical transmission system according to claim 4, wherein, when a first user device performs communication with a second user device accommodated in the same network node device as the first user device including an optical receiver of a direct detection scheme, an optical transmitter of the first user device communicates with the optical receiver of the second user device in conformity with an intensity modulation scheme, and
wherein, when the first user device performs communication with a third user device via a relay by the one or more network node devices, the optical transmitter of the first user device communicates with an optical receiver of a digital coherent detection scheme included in a network node device relaying communication between the first and third user devices, in conformity with a phase/frequency modulation scheme.

6. An optical transmission method comprising:

modulating an optical signal by one of a first modulator that generates an optical modulated signal through intensity modulation of the optical signal and a second modulator that generates an optical modulated signal through phase/frequency modulation of the optical signal; and switching a modulator of the optical signal to either the first or second modulator, wherein, in the switching, the modulator is switched to a modulator corresponding to a device of a communication partner between the first and second modulators, the second modulator realizes phase/frequency modulation of the optical signal by modulating a bias current to be applied to a light source that emits the optical signal to a modulated signal related to the modulator, and the first modulator realizes intensity modulation of the optical signal by applying a bias current at a current value larger than a bias current applied to the light source by the second modulator.

* * * * *